US006819364B2

(12) United States Patent
Creed et al.

(10) Patent No.: US 6,819,364 B2
(45) Date of Patent: Nov. 16, 2004

(54) SYSTEM AND METHOD FOR CONFIGURING AND INSTALLING INDIVIDUAL DEVICES OF A HOME ENTERTAINMENT SYSTEM

(75) Inventors: Anthony Lionel Creed, San Diego, CA (US); Aaron Dew, San Diego, CA (US); Matthew Chang, San Diego, CA (US); Rolf Toft, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 488 days.

(21) Appl. No.: 10/003,712

(22) Filed: Oct. 29, 2001

(65) Prior Publication Data

US 2003/0107674 A1 Jun. 12, 2003

(51) Int. Cl.[7] ................................................ H04N 5/50
(52) U.S. Cl. ..................... 348/569; 348/553; 348/552; 710/13
(58) Field of Search ............................... 348/563, 569, 348/552, 714, 734; 725/133, 141, 152; 700/11, 19; 710/8, 10, 13

(56) References Cited

U.S. PATENT DOCUMENTS

| | | | | |
|---|---|---|---|---|
| 5,341,166 A | * | 8/1994 | Garr et al. ................... 725/153 |
| 5,828,862 A | * | 10/1998 | Singkornrat et al. ......... 711/115 |
| 5,930,358 A | * | 7/1999 | Rao ............................ 713/193 |
| 6,069,663 A | * | 5/2000 | Bessel et al. ................ 348/446 |
| 6,185,629 B1 | * | 2/2001 | Simpson et al. .............. 710/10 |
| 6,311,268 B1 | * | 10/2001 | Chu ............................. 713/1 |
| 6,392,757 B2 | * | 5/2002 | Manowitz ................... 358/1.15 |
| 6,401,198 B1 | * | 6/2002 | Harmer et al. ................. 713/1 |
| 6,574,588 B1 | * | 6/2003 | Shapiro et al. ............... 703/24 |
| 6,599,194 B1 | * | 7/2003 | Smith et al. .................. 463/30 |
| 6,721,881 B1 | * | 4/2004 | Bian et al. ..................... 713/1 |
| 2002/0056090 A1 | * | 5/2002 | Wagner et al. ................ 725/32 |
| 2003/0061604 A1 | * | 3/2003 | Elcock et al. ............... 717/170 |
| 2003/0066080 A1 | * | 4/2003 | Kamieniecki ................ 725/80 |

* cited by examiner

Primary Examiner—Victor R. Kostak
(74) Attorney, Agent, or Firm—John L. Bogitz

(57) ABSTRACT

A system and method for configuring and installing devices of a home entertainment system includes a portable memory media that can be installed in a memory slot of a television. The portable memory media can be preprogrammed with set-up instructions that are displayed at the television. A user can follow these instructions step-by-step in order to properly install and configure a television and any peripheral entertainment devices.

8 Claims, 2 Drawing Sheets

SYSTEM AND METHOD FOR CONFIGURING AND INSTALLING INDIVIDUAL DEVICES OF A HOME ENTERTAINMENT SYSTEM

BACKGROUND OF THE INVENTION

1. Field of the Invention

The present invention relates generally to television systems.

2. Description of the Related Art

Televisions have become ubiquitous. In fact, many families own several televisions and may have a single "special" television dedicated to a multimedia home entertainment system. Typically, a home entertainment system includes multiple peripheral entertainment devices connected to a television. For example, a home entertainment system can include a digital versatile disk (DVD) player, a video cassette recorder (VCR), a personal video recorder (PVR), an audio/visual amplifier (A/V amp), a television broadcast receiver (i.e., a satellite receiver or a cable receiver), multiple speakers, and a game system attached to a television. Thus, the owner of such a system can watch and record television content, watch and record movies, play video games, etc. while experiencing "surround sound."

As is usually the case, instruction manuals are provided with the individual components of the entertainment system. Oftentimes, however, these instruction manuals can be quite confusing. Thus, it can be very difficult and frustrating when attempting to interconnect the individual electronic components so that they all work together to establish one cohesive entertainment system.

Accordingly, it is an object of the present invention to provide a means for minimizing the difficulty and confusion when interconnecting the individual components of a home entertainment system.

SUMMARY OF THE INVENTION

A system for installing an entertainment device in a home entertainment system includes a television having a peripheral electronic entertainment device connected thereto. A portable memory media is engageable with the television and the entertainment device. The memory media has set-up instructions for the television and/or the peripheral device stored thereon. The set-up instructions can be downloaded to the television and then displayed to help a user properly set-up and configure the television and/or the peripheral entertainment device. The stored set-up instructions can be augmented or otherwise tailored by information supplied via a network linking the television and the peripheral electronic entertainment device. Accordingly, some stored instructions may be skipped, new instructions may be generated, or the number or type of options available at certain steps may be modified according to the information received.

In a preferred embodiment, the memory media is a flash memory device. Preferably, the first peripheral device is selected from the group including: a DVD player, a VCR, a cable receiver, a satellite receiver, and a personal recording device. Also, the set-up instructions are dynamically established based on type or model of the peripheral device.

In another aspect of the present invention, a method is provided for configuring a home entertainment system that includes a television. The method includes engaging a portable memory media with the television. Set-up instructions are transmitted from the portable memory media to the television and displayed thereon.

In yet another aspect of the present invention, a method is provided for configuring an entertainment system having a television and a first electronic entertainment device connected thereto. The method includes engaging a portable memory media with the first electronic entertainment device. Set-up instructions for the first electronic entertainment device are transmitted from the first electronic entertainment device to the portable memory media. The portable memory media is engaged with television and the first electronic entertainment device set-up instructions are transmitted from the portable memory media to the television.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
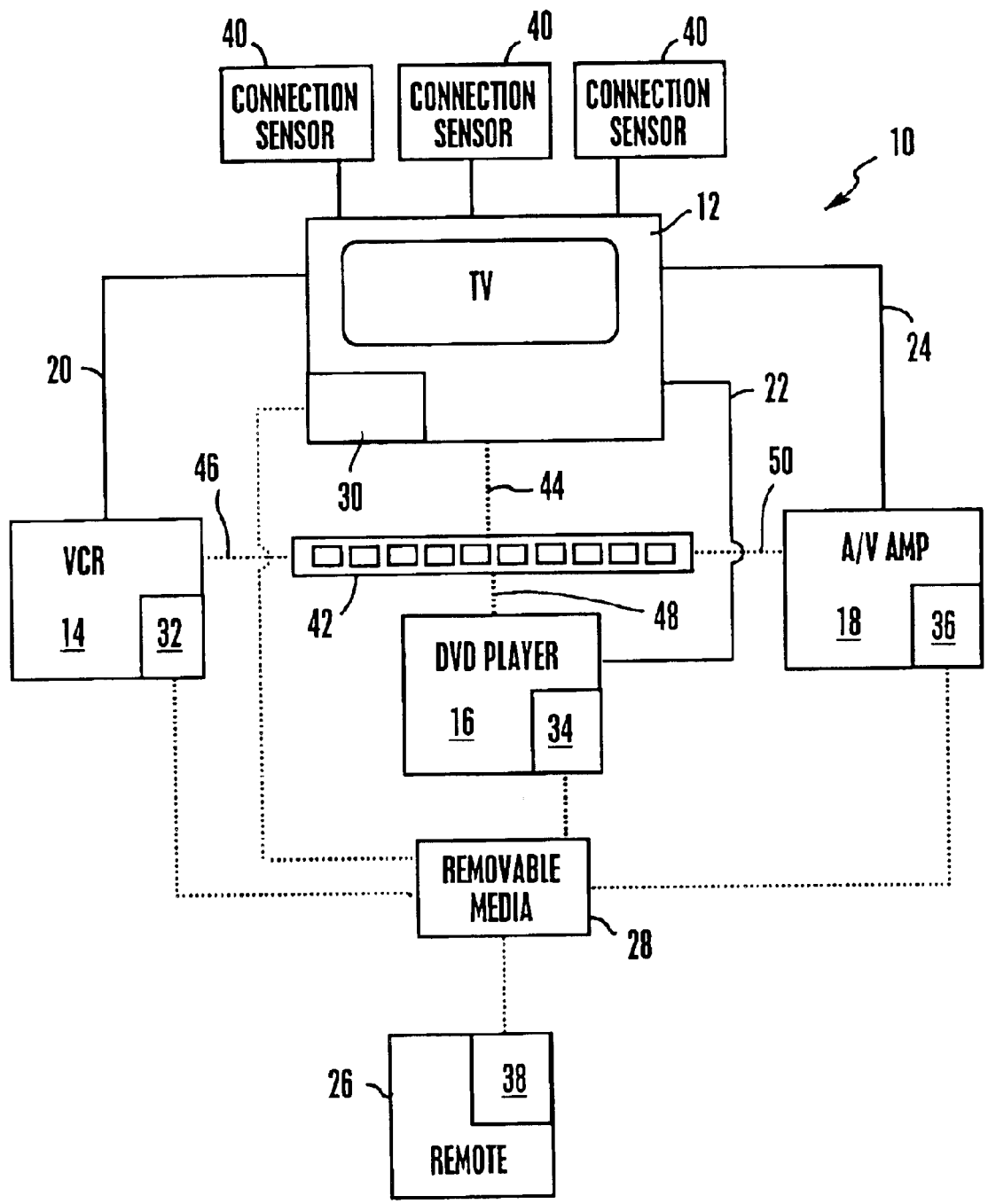
FIG. 1 is a block diagram of the system of the present invention.

Referring initially to FIG. 1, an entertainment system is shown, generally designated 10. As shown, the system 10 includes a television (TV) 12 having several peripheral entertainment devices that can be connected thereto. For example, a VCR 14, a DVD player 16 and an A/V amplifier 18 can be connected to the TV 12 via a first cable 20, a second cable 22, and a third cable 24, respectively. It is to be understood that more than three peripheral entertainment devices can be connected to the TV 12. Moreover, it can be appreciated that the peripheral entertainment devices can also be one or more of the following: a cable receiver, a satellite receiver, a personal recording device, a video game system, and any other similar device.

Also, the cables 20, 22, 24 can be coaxial cable, audio/video cable (A/V cable), composite video cable, super video cable (S video cable), luminance and chrominance video cable (Y & C video cable), component (Y, $P_B$, $P_R$) video cable, red blue green video cable (RGB video cable), optical cable, or any other connecting means well known in the art.

FIG. 1 further shows a single remote control unit 26 that can be used to control the TV 12, the VCR 14, the DVD player 16, and/or the A/V amp 18. As shown, the system 10 also includes a portable memory media 28 that can be removably engaged with the TV 12, the VCR 14, the DVD player 16, the A/V amp 18, and/or the remote control unit 26. In a preferred embodiment, the memory media 28 is a flash memory device, e.g., a Memory Stick® manufactured and distributed by Sony®. However, it is to be appreciated that the portable memory media 28 can be a portable random access memory (RAM) device, a portable electrically erasable programmable read-only memory (EEPROM) device, or any other similar portable media useful for transferring data or information from one device to another. As shown in FIG. 1, each of the above described devices, i.e., the TV 12, the VCR 14, the DVD player 16, the A/V amp 18, and the remote control unit 26, are formed with respective memory slots 30, 32, 34, 36, 38 that are configured to receive the portable memory media 28.

As described in detail below, information can be uploaded to the portable memory media 28, e.g., from the VCR 14, the DVD player 16, the A/V amp 18, and the remote control unit 26 and then, downloaded to the TV 12. This information can be used to facilitate the interconnection of these individual components of the entertainment system 10. In the alternative, the portable memory media 28 can be pre-programmed at the factory with the instructions necessary for interconnecting the individual components.

FIG. 1 further shows that the TV 12 can include multiple connection sensors 40 that enable the TV 12 to automatically determine when particular cables, wires, etc., and/or what type and brand of components are properly connected to the TV 12. Thus, as described below, the TV 12 can verify when certain instructions are completed, e.g., "Connect S-Video Cable to S-Video Input."

As shown in FIG. 1, the TV 12, VCR 14, DVD player 16, and A/V Amp 18 may be interconnected by a network device 42. In that case, each individual component 12, 14, 16, 18 can be connected to the network device 42 via a network cable 44, 46, 48, 50. It is to be understood that the network cables 44, 46, 48, 50 can, e.g., be Sony® iLink® cables, Ethernet cables, etc.

Figure 2:
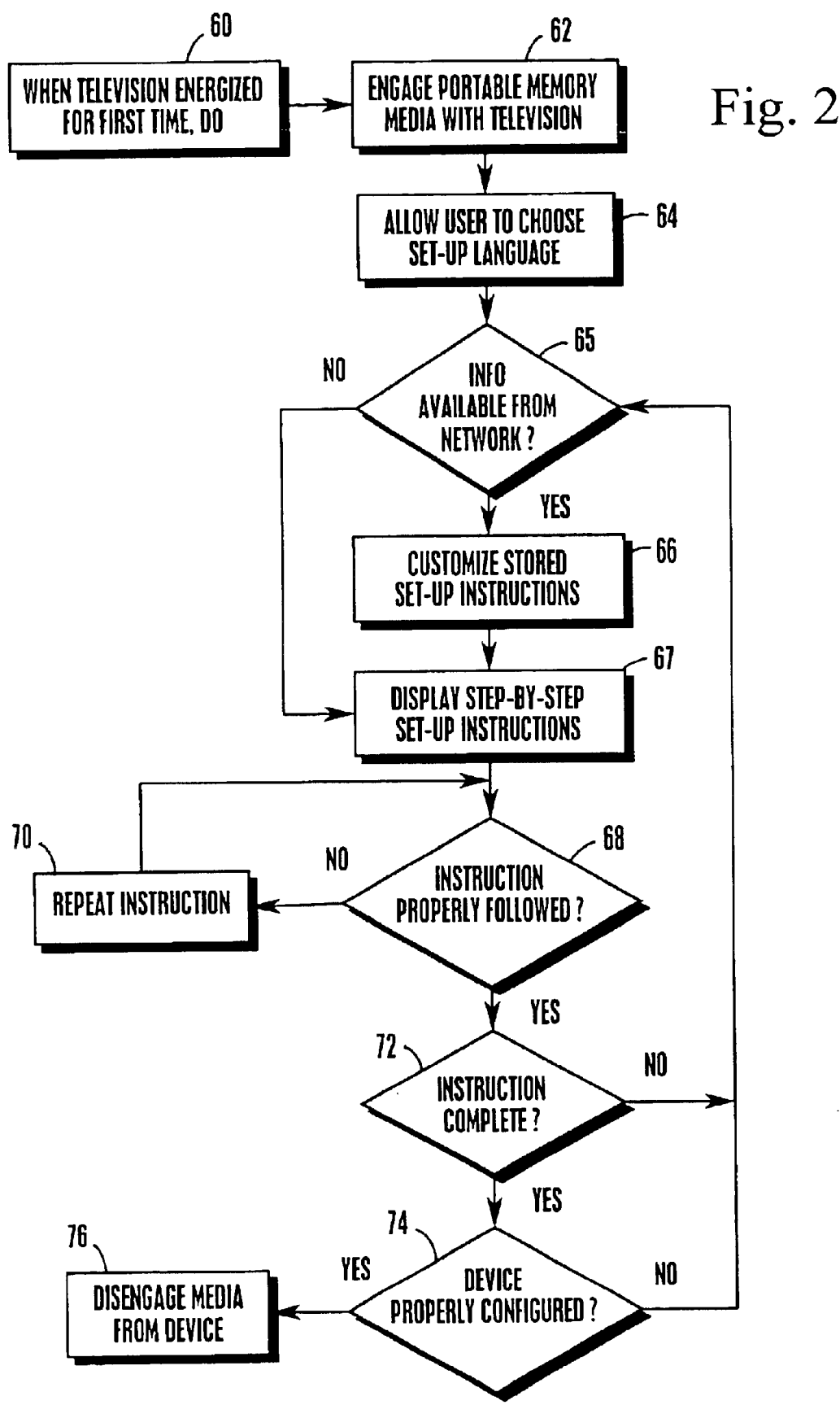
FIG. 2 is flow chart showing the method steps of the present invention.

Referring now to FIG. 2, the method steps of the present invention are shown and commence at block 60 with a do loop wherein the following steps are performed when the TV 12 is energized for the first time or when a new peripheral entertainment device is to be connected thereto. At block 62, the portable memory media 28 is engaged with the TV 12. Proceeding to block 64, a user is allowed to choose a set-up language, e.g., English, Japanese, Spanish, French, etc. Then, at decision diamond 65 it is determined whether information regarding the set-up instructions for the TV 12 are available from the network to which the TV 12 is connected. If so, the logic moves to block 66 where set-up instructions stored on the portable memory media 28 are customized in accordance with the information received from the network.

Next, at block 67, step-by-step set-up instructions are displayed at the TV 12 in the user preferred language. These set-up instructions can be downloaded from the portable memory media 28 to the television. It is to be understood that the portable memory media 28 can be pre-programmed with the set-up instructions for all the TV 12 and each of the peripheral devices or just a single device. In the alternative, set-up instructions can be uploaded to the portable memory media 28 from a particular peripheral entertainment device 14, 16, 18, e.g., by inserting the portable memory media 28 in the memory slot 32, 34, 36 of a particular peripheral device 14, 16, 18. The set-up instructions may then be downloaded to the TV 12 for display thereby. Or, the portable memory media 28 can be inserted in the TV 12 and establish set-up instructions based on signals from the sensors 40. In any case, the set-up instructions that are displayed can depend on the particular components connected to the TV 12. Returning to decision diamond 65, if information regarding the set-up instruction is not available from the network the logic moves directly to block 67 and the step-by-step set-up instructions are displayed without any customization.

Moving to decision diamond 68, after each step is displayed, it is verified whether the instruction has been properly followed, e.g., through the use of the connection sensors 40. In other words, when an instruction is displayed, e.g., "Connect the Coaxial Cable to the Coaxial Cable Input," the TV 12 can automatically determine if the coaxial cable has indeed been properly connected. If the instruction has not been properly followed, the logic moves to block 70 and the instruction is repeated. On the other hand, if the instruction has been properly followed, the logic continues to decision diamond 72 where it is determined whether all instructions have been displayed. If not, the logic returns to decision diamond 65 and continues as described above. Conversely, if all instructions have been displayed, the logic moves to decision diamond 74 where it is determined if the device has been properly configured and/or connected. If so, the portable memory media 28 can be disengaged from the TV 12 at block 76. If the device is not properly configured and/or connected, the logic returns to block 66 and the step-by-step instructions are repeated.

It is to be understood that the connection and/or configuration of the devices continue in a step-by-step fashion. Input from the user and the device dictate the sequence and content of the instructions. Thus, the user receives only the instructions necessary for setting up the device in relation to the user's existing equipment and redundant instructions are not displayed.

With the system and method described above the need for reading a confusing instruction manual is eliminated. A user need only engage the portable memory media 28 with the TV 12 and follow the instructions displayed thereon.

While the particular SYSTEM AND METHOD FOR CONFIGURING AND INSTALLING INDIVIDUAL DEVICES OF A HOME ENTERTAINMENT SYSTEM as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A method for configuring an entertainment system comprising at least one television and at least a first electronic entertainment device, comprising the acts of:

engaging a portable memory media with the first electronic entertainment device;

transmitting first electronic entertainment device set-up instructions from the first electronic entertainment device to the portable memory media;

engaging the portable memory media with the television; and transmitting the first electronic entertainment device set-up instructions from the portable memory media to the television.

2. The method of claim 1, further comprising the act of:
displaying the first electronic entertainment device set-up instructions at the television.

3. The method of claim 1, wherein the portable memory media is a flash memory device.

4. The method of claim 1, wherein the first electronic entertainment device is selected from the group including: a DVD player, a VCR, a cable receiver, a satellite receiver, and a personal recording device.

5. The method of claim 1, further comprising at least a second electronic entertainment device and further comprising the acts of:
engaging the portable memory media with the second electronic entertainment device;
transmitting electronic entertainment device set-up instructions from the second electronic entertainment device to the portable memory media;
engaging the portable memory media with the television; and
transmitting the second electronic entertainment device set-up instructions from the portable memory media to the television.

6. The method of claim 5, further comprising the act of:
displaying the second electronic entertainment device set-up instructions at the television.

7. The method of claim 6, wherein the second electronic entertainment device is selected from the group including: a DVD player, a VCR, a cable receiver, a satellite receiver, and a personal recording device.

8. The method of claim 1, wherein the television and first electronic entertainment device are connected to a network, and the method further comprises the acts of:
receiving information regarding the set-up instructions from the network; and
at least partially based on the information received from the network modifying the set-up instructions transmitted from the portable memory media.

* * * * *